(12) United States Patent
So et al.

(10) Patent No.: US 6,522,835 B2
(45) Date of Patent: Feb. 18, 2003

(54) PHOTOGRAPHIC FILM PACKAGE WITH DETACHABLE CARTRIDGE

(75) Inventors: Bangly K. W. So, New Territories (HK); Ivan W. K. Shum, New Territories (HK); Roland Walter Kohl, New Territories (HK)

(73) Assignee: Hi-Lite Camera Company Limited (HK)

( * ) Notice: Subject to any disclaimer, the term of this patent is extended or adjusted under 35 U.S.C. 154(b) by 0 days.

(21) Appl. No.: 09/769,568

(22) Filed: Jan. 25, 2001

(65) Prior Publication Data

US 2001/0041066 A1 Nov. 15, 2001

Related U.S. Application Data (60) Provisional application No. 60/178,591, filed on Jan. 28, 2000.

(51) Int. Cl.[7] .............................................. G03B 17/02
(52) U.S. Cl. ............................ 396/6; 396/440; 396/511
(58) Field of Search ........................... 396/6, 440, 535, 396/513, 511, 512

(56) References Cited

U.S. PATENT DOCUMENTS

| | | | |
|---|---|---|---|
| 3,918,075 A | * 11/1975 | Horn et al. | 396/396 |
| 4,630,915 A | * 12/1986 | Whiteside et al. | 242/343.2 |
| 4,752,797 A | 6/1988 | Sekine et al. | |
| 4,833,495 A | 5/1989 | Ohmura et al. | |
| 4,855,774 A | 8/1989 | Ohmura et al. | |
| 4,884,087 A | 11/1989 | Mochida et al. | |
| 4,954,857 A | 9/1990 | Mochida et al. | |
| 4,972,649 A | 11/1990 | Mochida et al. | |
| 5,063,400 A | 11/1991 | Takei et al. | |
| RE34,168 E | 1/1993 | Ohmura et al. | |
| 5,235,364 A | 8/1993 | Ohmura et al. | |
| D345,750 S | 4/1994 | Arai | |
| 5,361,111 A | 11/1994 | Yamashina et al. | |
| 5,381,200 A | 1/1995 | Takagai | |
| D356,101 S | 3/1995 | Arai | |
| 5,408,288 A | 4/1995 | Ogura et al. | |
| 5,436,685 A | 7/1995 | Yamashina | |
| 5,649,236 A | 7/1997 | Balling | |
| 5,828,919 A | * 10/1998 | Furuya et al. | 396/440 |
| 6,247,854 B1 | * 6/2001 | Terada | 396/440 |
| 6,249,646 B1 | * 6/2001 | Chen | 396/440 |

FOREIGN PATENT DOCUMENTS

DE     37 45 082 C2     11/1997

* cited by examiner

*Primary Examiner*—David M. Gray
(74) *Attorney, Agent, or Firm*—Armstrong Teasdale LLP (57) ABSTRACT

A lens-fitted photographic film package with dual lens includes a film-free self-activating shutter mechanism and a detachable cartridge for removing and installing film. A 35-mm film cartridge is attached to a cartridge adapter, and a filmstrip end is inserted and pre-wound into a winding housing including a winding spool therein. As photographs are taken, film is advanced frame-by-frame into the film cartridge, where it may be easily removed from the adapter without rewinding of the film, and replaced by a fresh film cartridge. Thus, the adapter transforms the lens-fitted photographic film package into a reusable package.

28 Claims, 6 Drawing Sheets

PHOTOGRAPHIC FILM PACKAGE WITH DETACHABLE CARTRIDGE

CROSS REFERENCE TO RELATED APPLICATIONS

This application claims the benefit of U.S. Provisional Application Serial No. 60/178,591 filed Jan. 28, 2000.

BACKGROUND OF THE INVENTION

This invention relates generally to compact cameras, and more particularly, to lens-fitted photographic film packages.

Conventional compact cameras typically include a body that houses photographic lenses, shutter mechanisms, battery powered flash mechanisms, and removable film packages, typically sold separately in rolls or cassettes. When a film package has been completely used, it is removed from the body for photographic processing, and a fresh film package is inserted into the body so that more pictures may be taken. However, care must be taken when installing and removing film packages to avoid damaging exposure of the film to light, and in some types of cameras, such as 35-mm cameras, film must be carefully loaded and threaded into a film feeder mechanism. Typically, a rewind mechanism is required to reload film into the film package before it may be removed from the camera body. Consequently, 35-mm cameras are somewhat complicated, relatively expensive, and are often difficult for novices to use.

Lens-fitted photographic film packages, otherwise known as single use cameras or disposable cameras present a compact, easy to use alternative to conventional compact cameras. Consumers buy such lens fitted film packages, take a number of pictures, and return the entire package for film processing where the film is professionally removed and processed. However, lens-fitted film packages generate a large amount of waste as the packages generally may not be reused. Therefore, if consumers desire to take more photographs after one lens-fitted photographic film package is used, they must purchase another lens-fitted-photographic film package.

Accordingly, it would be desirable to provide an easily used and less wasteful lens-fitted 35-mm photographic film package capable of taking more photographs than known lens-fitted photographic film packages.

BRIEF SUMMARY OF THE INVENTION

In an exemplary embodiment of the invention, a detachable cartridge for a lens-fitted photographic film cartridge includes a rounded bracket adapted for receiving a film element, a winding housing extending from the rounded bracket, and film element guide tracks extending between the rounded bracket and the film element. The detachable cartridge is loaded with a film element, such as a conventional 35-mm film cartridge, and the film is pre-wound into the winding housing and advanced frame-by-frame back into the film cartridge during use of the lens-fitted photographic film package. Therefore, the film cartridge may be easily removed from the detachable cartridge for processing without requiring a rewind mechanism and without exposing the film to damaging light.

More specifically, an exemplary lens-fitted photographic film cartridge includes a body, a lens element within the body, a film element housing adjacent the lens element, the detachable film cartridge within the element housing, and a rear door attached to the body and enclosing the detachable film cartridge. The rear door is lockable with a slide out battery cover, and when the rear door is opened, the detachable film cartridge may be easily lifted from the film element housing.

As photographs are taken, a film-free self-activating shutter mechanism advances film from the detachable cartridge winding housing to the film cartridge, and a counter system displays to a user the number of photographs taken or a number of unused frames of the film cartridge. After a pre-installed film cartridge is fully used, the film cartridge is removed from the detachable cartridge and a new cartridge is inserted into the detachable cartridge. The detachable cartridge winding housing includes a spool and an attached handle for manually winding the filmstrip into the winding chamber after feeding an end of the filmstrip from the film cartridge through guide tracks to the winding housing. The detachable cartridge may then be placed within the film element housing, and, after closing the rear door and locking the rear door with the battery cover, the lens-fitted photographic film package may be reused.

DETAILED DESCRIPTION OF THE INVENTION

Figure 1:
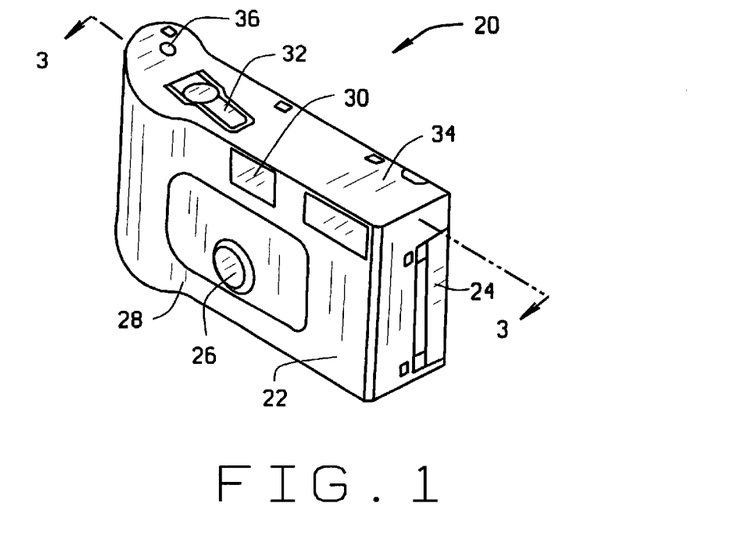
FIG. 1 is a front perspective view of an exemplary lens-fitted photographic film package.

FIG. 1 is a front perspective view of an exemplary lens-fitted photographic film package 20 including a body 22, a rear door 24 attached to body 22, a dual lens element 26 extending through a front 28 of body 22, a view finder 30 extending through body front 28, a shutter-activating member 32 located on a top wall 34 of body 22, and a counter system 36 located on body top wall 34. Body 22 is fabricated from known opaque materials according to known methods and techniques to form a light resistant chamber (not shown in FIG. 1) that houses a film element (not shown in FIG. 1). Rear door 24 is hinged to body 22 for selective movement between an open position (not shown) and a closed position wherein rear door 24 is locked in place by a slide insert battery door (not shown in FIG. 1).

Figure 2:
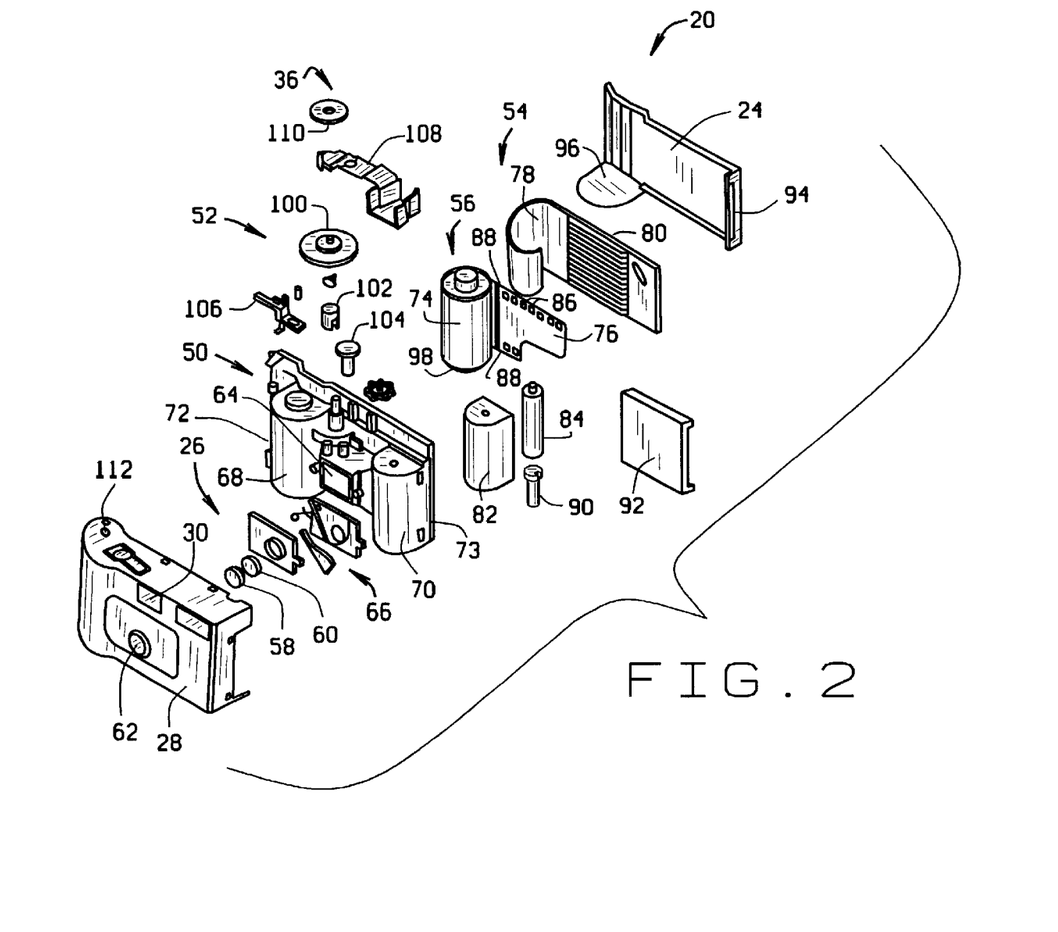
FIG. 2 is a front exploded perspective view of the lens-fitted photographic film package shown in FIG. 1.

FIG. 2 is an exploded perspective view of lens-fitted photographic film package 20 including dual lens element 26, a film element housing 50, frame counter system 36, a film-free self-activating shutter mechanism 52, and a detachable cartridge 54 for receiving film element 56. Dual lens element 26 includes first and second lenses 58, 60 and extends through a central opening 62 of body front 28, and dual lens element 26 is substantially aligned with a central opening 64 of film element housing 50. Interposed between dual lens element 26 and film element housing 50 is a shutter 66 that is selectively positionable with film-free self activating shutter mechanism 52 to expose a frame (not shown in FIG. 2) of film element 56 to light and therefore forming a photograph image of an object or scene located with viewfinder 30.

Film element housing 50 includes a substantially cylindrical film element chamber 68 and a substantially cylindrical winding chamber 70 positioned substantially adjacent opposite sides 72, 73 of film element housing 50. In an exemplary embodiment, film element 56 is a known 35-mm film cartridge 74 fabricated from opaque materials and including a roll (not shown) of filmstrip 76. Film element cartridge 74 is snap fit into a rounded cartridge bracket 78 and filmstrip 76 is advanced through flat guide tracks 80 into a winding housing 82 including a spool 84 for engaging feeder openings 86 located adjacent opposite filmstrip sides 88, and a crank handle 90 coupled thereto. Unlike conventional lens-fitted photographic film packages with curved film element guide tracks located on a rear body portion, adapter guide tracks 80 are flat by virtue of dual lens element 26 that reduces distortion and improves picture quality in comparison to known lens-fitted photographic film packages.

An opaque cover 92 is provided and dimensioned to overlie flat guide tracks 80 with snap-fit engagement to protect filmstrip 76 from exposure to light. As explained further below, opaque cover 92 allows loading of film element 56 during daylight without damaging filmstrip 76. Rear door 24 is attached to body 22 on hinges 94 that allow rear door 24 to be opened for removal and installation of detachable cartridge 54, and also includes a rounded tab 96 that supports a bottom 98 of film element cartridge 74.

Shutter mechanism 52 includes an advance wheel 100, a transmission gear 102, a sprocket gear 104, and a shutter kicker lever 106 to actuate shutter 66 as explained further below. Also, counter system 36 is positioned on a mounting bracket 108 for engagement with advance wheel 100. Counter system 36 includes a top surface 110 having indicia (not shown) to display a number of available frames, or alternatively a number of used frames, of film element 56 through an opening 112 in body top wall 34.

Figure 3:
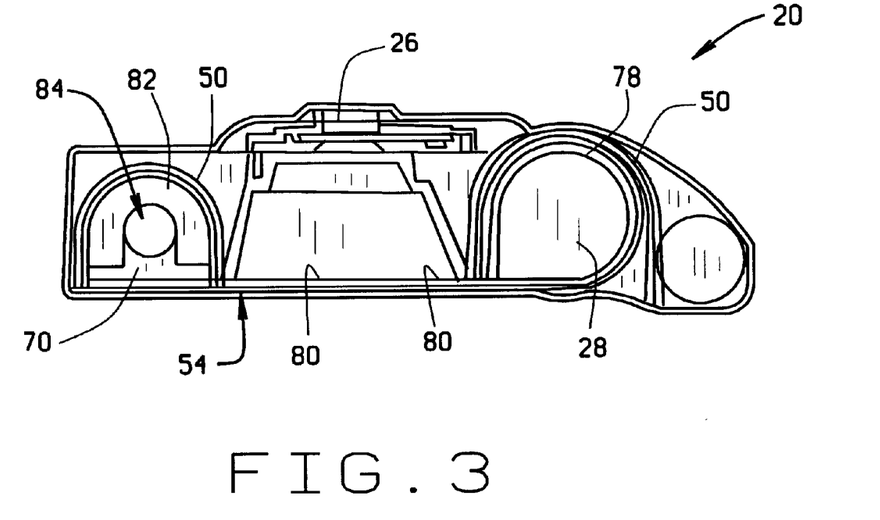
FIG. 3 is a cross sectional view of the lens-fitted photographic film package shown in FIG. 1 taken along line 3—3.

FIG. 3 is a cross sectional view of lens-fitted photographic film package 20 including dual lens element 26 situated between film element chamber 68 and winding chamber 70 of film element housing 50. Rounded cartridge adapter bracket 78 receives film element cartridge 74 (shown in FIG. 2) and filmstrip 76 (shown in FIG. 2) is advanced through flat guide tracks 80 and into winding chamber 70. Winding spool 84 engages filmstrip 76 for winding filmstrip 76 around spool 84 within winding housing 82 located inside film element housing winding chamber 70. As explained further below, filmstrip 76 is manually pre-wound around spool 84 from film element cartridge 74, and advanced frame-by-frame back into film element cartridge 74 during use of lens-fitted photographic film package 20 to facilitate rapid removal of film element cartridge 74 from detachable cartridge 54 without requiring a rewind mechanism familiar to known lens-fitted photographic film packages.

Figure 4:
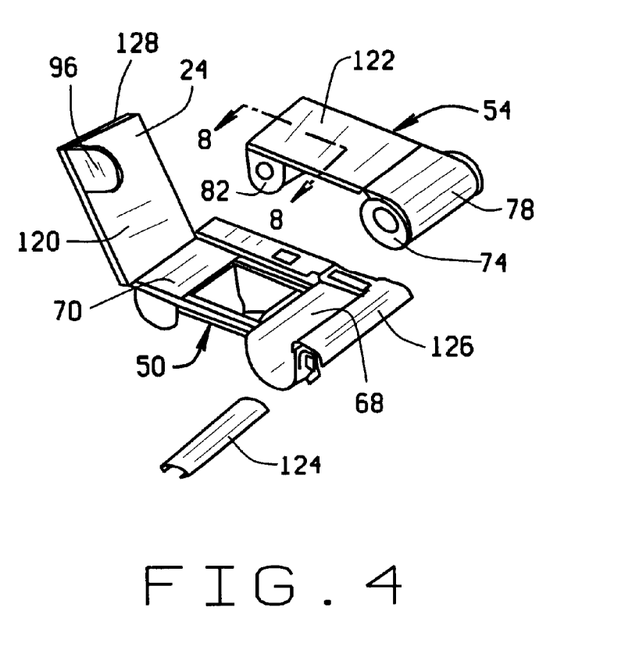
FIG. 4 is an exploded perspective rear view of an exemplary detachable film cartridge and housing.

FIG. 4 is an exploded perspective view of detachable cartridge 54 loaded with film element cartridge 74. When rear door 24 is opened, detachable cartridge 54 is easily lifted from and returned to film element housing 50. When rounded cartridge bracket 78 and winding housing 82 are placed into film element housing film element chamber 68 and winding chamber 70, respectively, rear door 24 closes over detachable cartridge adapter 54 so that an inner surface 120 of rear door 10 24 is substantially adjacent and overlying an outer surface 122 of detachable cartridge 54. Rear door rounded tab 96 extends substantially perpendicularly from rear door inner surface 120 and retains film element cartridge 74 within film element chamber 68. Once rear door 24 is in a closed position, a battery cover 124 slides over a ledge 126 adjacent an edge 128 of rear door 24 to prevent rear door 24 from opening and maintaining rear 24 in a closed position. Once battery 124 is removed, rear door 24 is easily opened and detachable cartridge 54 may be removed. Also, battery cover 124 protects a known battery source (not shown) for use in known battery powered systems (not shown) such as, for example, a flash bulb system.

Figure 5:
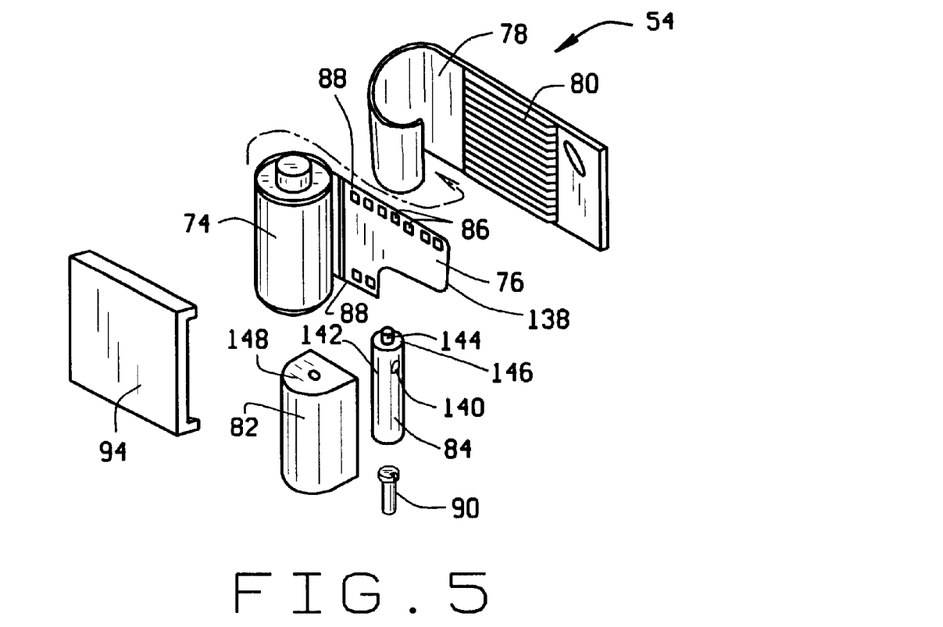
FIG. 5 is a exploded perspective front view of the exemplary detachable film cartridge shown in FIG. 4.

FIG. 5 is a front exploded perspective view of detachable film cartridge 54 illustrating installation of filmstrip 76. In one embodiment, a known 35 mm film cartridge 74 is snap-fit into cartridge rounded bracket 78. Opaque cover 94 is snap-fit over guide tracks 80 of cartridge rounded bracket 78 and an end 138 of filmstrip 76 is fed through guide tracks 80 into winding housing 82 for engagement with winding spool 84 therein. A knob 140 projects radially from an outer surface 142 of spool 84 and engages one of a plurality of feeder openings 86 through filmstrip 76 adjacent opposite filmstrip sides 88 as spool 84 is manually turned with crank handle 90. A pin 144 projects from a top surface 146 of spool 84 and extends into a top 148 of winding housing 82 to maintain spool 84 in position relative to winding housing 82.

Figure 6:
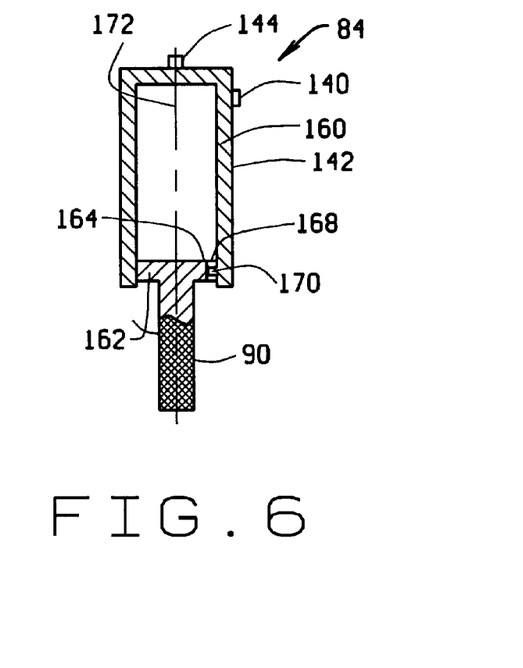
FIG. 6 is a cross sectional view of an exemplary winding spool in an extended position for the detachable film cartridge shown in FIG. 5.

FIG. 6 is a cross sectional view of winding spool 84 including a substantially cylindrical body 160, and crank handle 90 including a head 162 dimensioned for sliding engagement therein for reciprocal movement of crank handle 90 relative to spool body 160. A keyway 164 on an outer circumference 168 of crank handle head 162 receives a radially inward projecting ledge 170 of spool body 160. Keyway 164 and ledge 170 couple spool body 160 and crank handle 90 together so that as crank handle 90 is rotated about a longitudinal axis 172, spool body 160 also rotates as spool body 160 is maintained in position relative to winding housing 82 (shown in FIG. 5) by pin 144. Knob 140 projects from outer surface 142 of spool body 160 so as to engage filmstrip feeder openings 86 (shown in FIG. 5) to wrap filmstrip 76 around spool body 160 as crank handle 90 is turned about longitudinal axis 172.

Figure 7:
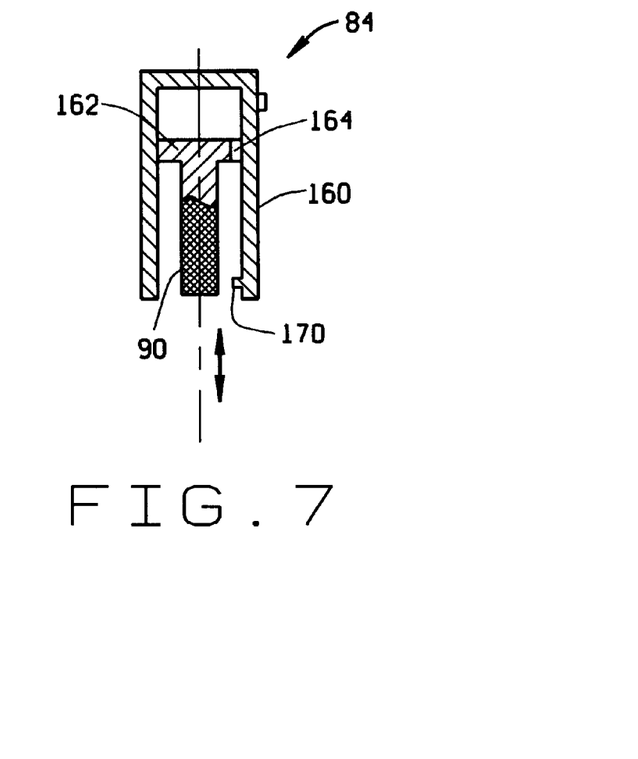
FIG. 7 is a view similar to FIG. 6 but illustrating the winding spool in a retracted position.

FIG. 7 illustrates crank handle 90 in a retracted position wherein crank handle head 162 is positioned relative to spool body 160 so that substantially an entirety of crank handle 90 is located within spool body 160. In one embodiment, crank handle 90 is selectively moved between an extended position (shown in FIG. 6) and a retracted position (shown in FIG. 7) with gravity assistance by holding detachable cartridge 54 vertically so that gravitational forces either extend or retract crank handle 90 within spool body 160. In alternative embodiments, other coupling features (not shown), including but not limited to, threads or pins, are use in lieu of spool body projecting ledge 170 and crank handle keyway 164 to couple crank handle 90 to spool body 160 for rotational motion to wrap or wind filmstrip (shown in FIG. 5) around spool 84.

Figure 8:
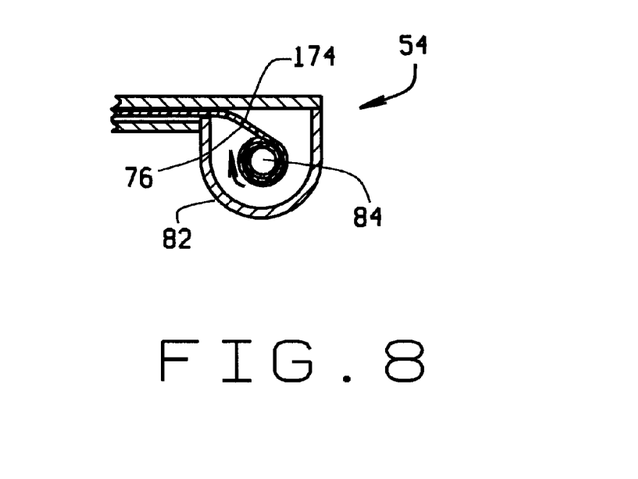
FIG. 8 is a cross sectional view of a portion of the film cartridge shown in FIG. 4 taken along line 8—8.

FIG. 8 is a cross sectional view of detachable cartridge 54 through winding housing 82 and illustrating a spring strip element 174 to direct filmstrip 76 to spool 84 and facilitate engagement of filmstrip 76 with spool knob 140, as well as to ensure that filmstrip 76 is tightly wound around spool 84 as spool crank handle 90 is rotated. Substantially all of filmstrip 76 is manually wound around spool body 160, and filmstrip 76 is then advanced backward frame-by-frame into film element cartridge 74 as explained below.

Figure 9:
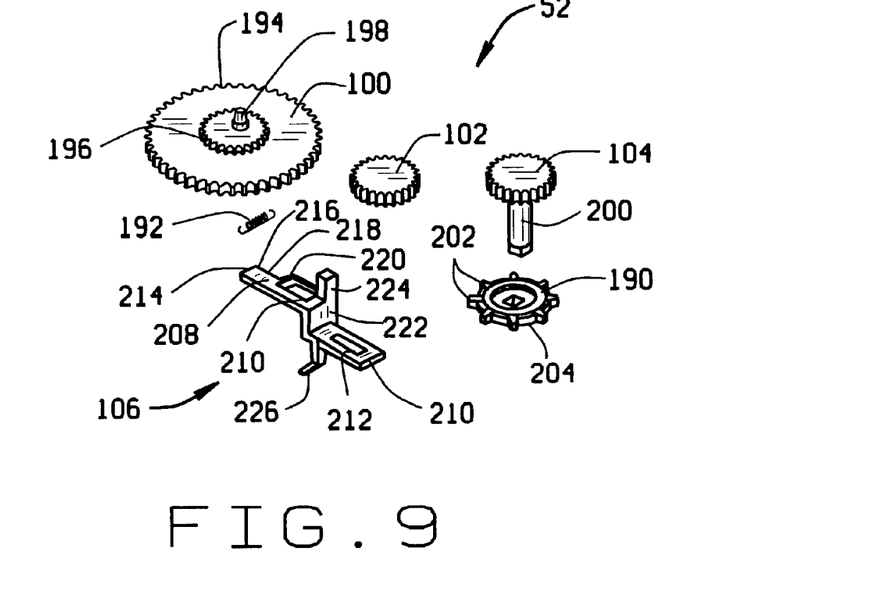
FIG. 9 is a schematic perspective view of an exemplary shutter mechanism shown in FIG. 2.

FIG. 9 is a schematic perspective view of film-free self-activating shutter mechanism 52 including advance wheel 100, transmission gear 102, a sprocket gear 104, a sprocket wheel 190, shutter kicking lever 106, and a spring element 192. Advance wheel 100 includes an outer surface 194 for rotational engagement by a user, and a concentric inner surface 196 for driving engagement with transmission gear 102. Inner surface 196 includes an actuating pin 198 for engagement with shutter kicking lever 106 as described further below. Transmission gear 102 is driven by advance wheel 100. Sprocket gear 104 is driven by transmission gear 102, and sprocket wheel 190 is coupled to a shaft 200 extending below transmission gear 102. Sprocket wheel 190 includes a plurality of spokes 202 projecting radially outward from an outer perimeter 204 of sprocket wheel 190. Spokes 202 engage filmstrip feeder openings 86 (shown in FIG. 5) so that rotation of sprocket wheel 190 advances filmstrip 76 from winding housing 82 (shown in FIG. 5) to film element cartridge 74 (shown in FIG. 5). Because a gear ratio of film advance wheel 100 to sprocket gear 104 is 1:1, filmstrip 76 (shown in FIG. 5) is advanced one frame for each complete revolution of advance wheel 100.

Shutter-kicking lever 106 includes first and second pillar supports 208, 210 including respective first and second elongated openings 210, 212 therethrough. First pillar support 206 includes a flat end 214, a rounded corner 216 extending between flat end 214 and a flat follower portion 218 extending substantially perpendicular to flat end 214. Follower portion 218 includes a riser segment 220, i.e., an upwardly curved segment, adjacent first opening 210. Second pillar support 208 is substantially rectangular, extends parallel to first pillar segment 206, and is connected to first pillar segment 206 with a connecting wall 222 extending substantially perpendicular to both first and second pillar supports 206, 208. An actuator projection 224 extends from connecting wall 222 above first pillar support 206, and a kicker arm 226 extends below second pillar support 210 to actuate shutter 66 (shown in FIG. 2) against the action of spring element 192 as advance wheel 100 is rotated.

Figure 10:
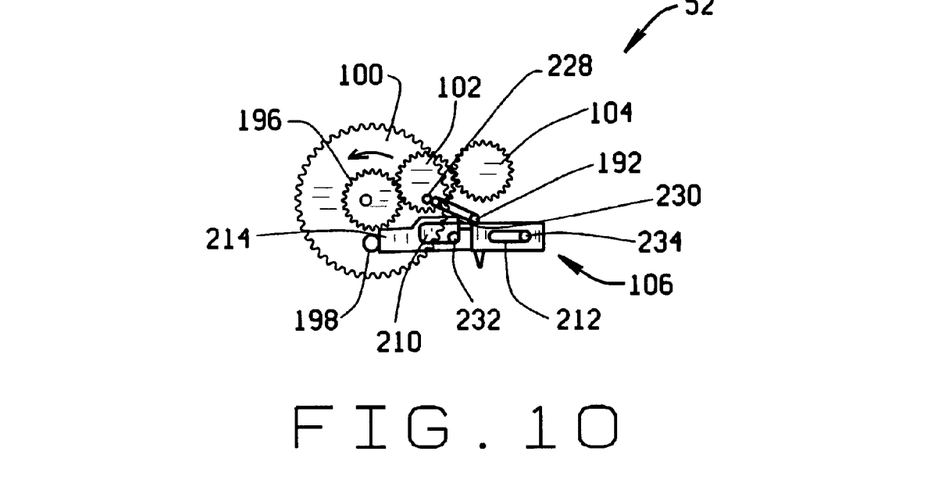
FIG. 10 is a plan view of the shutter mechanism shown in FIG. 9 in an initial position.
Figure 11:
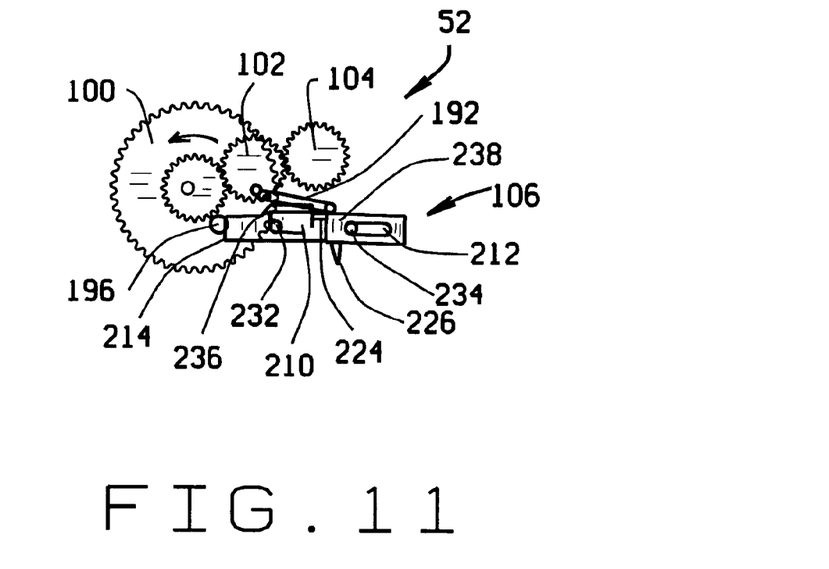
FIG. 11 is a view similar to FIG. 10 illustrating the shutter mechanism in an activation position.

FIGS. 10 and 11 are plan views of film-free self-activating shutter mechanism 52 in use. Advance wheel inner surface 196 is drivingly coupled to transmission gear 102, and transmission gear 102 is drivingly coupled to sprocket gear 104. Spring element 192 is coupled to transmission gear 102 on a first end 228, and to shutter kicking lever 106 on a second end 230. Shutter kicking lever 106 is supported on first and second pillars 232, 234 extending through pillar support first and second openings 210, 212, respectively.

As illustrated in FIG. 10, as film advance wheel 100 rotates, advance wheel actuating pin 198 rotates into engagement with flat end 214 of shutter-kicking lever 106 in an initial position. As film advance wheel 100 is further rotated, film advance wheel actuating pin 198 moves shutter-kicking lever 106 to an activation position shown in FIG. 11. In the activation position, further lateral movement of shutter kicker 106 is prevented by pillars 232, 234 positioned against respective ends 236, 238 of first and second pillar support openings 210, 212, and spring element 192 is in a fully extended position.

When shutter-activating member 32 (shown in FIG. 1) is depressed, shutter activating member 32 contacts shutter-kicking lever actuator projection 224 and moves shutter kicker lever 106 to disengage advance wheel actuating pin 198 from shutter kicker lever flat end 214 and releases shutter kicker lever 106 from the activation position. Once shutter-kicking lever 106 is released from the activation position, spring element 192 recoils and causes shutter kicking lever 106 to pivot about pillars 232, 234 and return to the initial position illustrated in FIG. 10. As shutter kicker lever 106 returns to the initial position, kicker arm 226 actuates shutter 66 (shown in FIG. 2), thereby exposing a frame of filmstrip 76 to light and forming a photographic image. As film advance wheel 100 is rotated back to the initial position, sprocket wheel 190 (shown in FIG. 9) advances filmstrip 76 (shown in FIG. 5) by one frame. Therefore, a fresh frame of filmstrip 76 is in position and photographic film package 20 (shown in FIG. 1) is ready for taking another photograph when shutter-activating member 32 is depressed.

Figure 12:
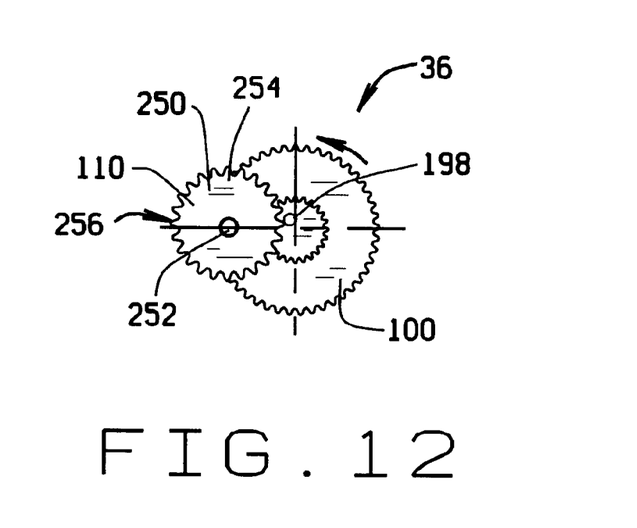
FIG. 12 is a plan view of an exemplary frame counter system.

FIG. 12 is a top plan view of frame counter system 36 including a counter wheel 250 supported on a pillar 252 of a mounting bracket 108 (shown in FIG. 2) located partially over film advance wheel 100. When film advance wheel 100 is rotated, advance wheel actuating pin 198 engages one of teeth 254 on an outer surface 256 of counter wheel 250. As film advance wheel 100 is rotated further, advance wheel actuating pin 198 disengages with counter wheel teeth 254 and counter wheel 250 ceases to rotate. Because film advance wheel 100 rotates one complete revolution for each filmstrip frame, advance wheel actuating pin 198 engages one counter wheel tooth 254 per filmstrip frame. Consequently, counter wheel 250 indicates available frames remaining or used frames for lens-fitted photographic film package 20 (shown in FIG. 1) with appropriately placed indicia (not shown) on top surface 110 of counter wheel 250.

The above-described lens-fitted photographic film package 20 may be used according to the following method once lens-fitted photographic film package 20 is assembled. In a particular embodiment, detachable film cartridge 54 (shown in FIGS. 4 and 5) is pre-loaded with a conventional 35-mm film cartridge 74 (shown in FIGS. 4 and 5) and filmstrip 76 (shown in FIG. 5) is pre-wound into detachable winding cartridge 54 (shown in FIG. 5) using spool 84 and crank handle 90 therein as filmstrip 76 is fed through guide tracks 80 into winding housing 82 until a last filmstrip frame is positioned within adapter guide tracks 80. Detachable cartridge 54 is installed into film element housing 50 and rear door 24 is closed over detachable cartridge 54. Photographic film package 20 is then ready for use.

A user takes photographs by locating a desired object or scene with viewfinder 30 (shown in FIG. 1) and depressing shutter activating member 32 when shutter mechanism 52 is in the activation position (shown in FIG. 11) to actuate shutter mechanism 52 to take a photograph. By rotating film advance wheel 100 until shutter mechanism 52 is returned to the initial position (shown in FIG. 10), another filmstrip frame is positioned behind shutter 66 (shown in FIG. 2) and another photograph may be taken. With each complete revolution of advance wheel 100, counter wheel 250 (shown in FIG. 12) is incrementally rotated and corresponding indicia (not shown) is displayed to the user. The above process is repeated until all filmstrip frames have been used and substantially all of filmstrip 76 is returned to standard film cartridge 74.

By removing battery cover 124 (shown in FIG. 4), rear door 24 may be opened and rotated about hinges 94 (shown in FIG. 2). Detachable cartridge 54 may then be removed from film element housing 50 and film cartridge 74 removed from cartridge rounded bracket 78 (shown in FIG. 2) to process the film. A new film cartridge may then be snapped into adapter rounded bracket 78, and after snapping opaque cover 92 (shown in FIG. 5) over adapter guide tracks 80, film cartridge 74 (shown in FIG. 5) may be rotated to feed filmstrip 76 (shown in FIG. 5) through adapter guide tracks 80 and into engagement with spool 84, where filmstrip 76 may be pre-wound inside winding housing 82 (shown in FIG. 5). Opaque cover 92 is then removed and detachable film cartridge 54 is reinstalled into film element housing 50. By closing rear door 24, and reinstalling battery cover 124, lens-fitted photographic film package 20 is ready for reuse. Film element 56 may be reinstalled either by customers or professional film processors.

Therefore, an easy to use lens-fitted photographic film package 20 is provided that is less wasteful than known single use cameras by its capacity to be reused. Detachable cartridge 54 and opaque cover 92 allow risk free loading and unloading of film even in daylight hours, and dual lens element 26 compensates for light distortion to improve photograph quality. Thus, the above-described lens-fitted photographic film package 20 combines the advantages of single use cameras and conventional compact cameras.

While the invention has been described in terms of various specific embodiments, those skilled in the art will recognize that the invention can be practiced with modification within the spirit and scope of the claims.

What is claimed is:

1. A detachable cartridge for a lens-fitted photographic film package including a film element, said detachable cartridge comprising:

a rounded bracket adapted for receiving a film element;
   a winding housing extending from the rounded bracket;
   guide tracks extending between said rounded bracket and said film element; and
   an opaque cover overlying said guide tracks, thereby preventing exposure of the film element to light.

2. A detachable cartridge in accordance with claim 1 wherein said opaque cover is configured for snap fit engagement over said guide tracks.

3. A detachable cartridge in accordance with claim 1 further comprising a spool rotatably mounted to said winding housing, said spool adapted for engaging the film element.

4. A detachable cartridge in accordance with claim 3 wherein the spool comprises an outer surface, said detachable cartridge further comprising a spring element adapted for engaging the film element to said outer surface.

5. A detachable cartridge in accordance with claim 3 further comprising a crank handle coupled to said spool for rotational movement thereof.

6. A detachable cartridge in accordance with claim 5 wherein said crank handle comprises a head, said spool comprises a body, said head adapted for reciprocal movement within said body between an extended position and a retracted position.

7. A detachable cartridge in accordance with claim 5 wherein said head comprises a keyway, said body comprises a ledge, said head received in said keyway when said crank handle is in said extended position.

8. A detachable cartridge in accordance with claim 1 wherein said guide tracks are flat.

9. A lens-fitted photographic film package comprising:

a body;
   a lens element within said body;
   a film element housing;
   a detachable film cartridge within said film element housing;
   a film element within said detachable film cartridge; and
   a rear door attached to said body and enclosing said detachable film cartridge.

10. A lens-fitted photographic film package in accordance with claim 9 wherein said lens element comprises a first lens and a second lens.

11. A lens-fitted photographic film package in accordance with claim 9 wherein said film element housing comprises a film element chamber and a winding chamber.

12. A lens-fitted photographic film package in accordance with claim 11 wherein said detachable cartridge comprises a rounded bracket adapted to receive said film element, said rounded bracket received in said film element chamber when said detachable cartridge is installed in said film element housing.

13. A lens-fitted photographic film package in accordance with claim 11 wherein said detachable cartridge comprises a winding housing, said winding housing received in said winding chamber when said detachable cartridge is installed in said film element housing.

14. A lens-fitted photographic film package in accordance with claim 13, said detachable cartridge further comprising a spool rotatably mounted within said winding housing.

15. A lens-fitted photographic film package in accordance with claim 14 wherein said spool comprises a cylindrical body, said detachable cartridge further comprising a crank handle mounted within said body for reciprocal movement between an extended position and a retracted position.

16. A lens-fitted photographic film package in accordance with claim 9 further comprising a shutter and a shutter activating mechanism.

17. A lens-fitted photographic film package in accordance with claim 16 wherein said film element includes a film cartridge, said film element pre-wound from said film cartridge into said detachable film cartridge, said film element advanced into said film cartridge by said shutter activating mechanism.

18. A lens-fitted photographic film package in accordance with claim 15 further comprising a frame counter system.

19. A lens-fitted photographic film package in accordance with claim 9 further comprising a removable battery cover attached to said film element housing, said battery cover preventing said rear door from opening when said rear door is closed and said battery cover is attached.

20. A method for loading a detachable cartridge of a lens-fitted photographic film package with a film element, the detachable cartridge including film element including an opaque cover and guide tracks extending between a rounded bracket and a winding housing, the winding housing including a spool, the film element including a cartridge and a filmstrip therein, said method comprising the steps of:

inserting the film cartridge into the rounded bracket while the cartridge is detached from the film package;
   feeding the filmstrip from the cartridge through the guide tracks and into the winding housing; and
   winding the filmstrip around the spool, thereby pre-winding the filmstrip around the spool before loading the cartridge into the film package.

21. A detachable cartridge for a lens fitted photographic film package, said detachable cartridge comprising:

a bracket adapted for receiving a film element; and a winding housing extending from said bracket.

22. A detachable cartridge in accordance with claim 21 wherein said bracket is at least partially rounded.

23. A detachable cartridge for a lens fitted photographic film package, said detachable cartridge comprising:

a bracket;

a film cartridge received in said bracket, said film cartridge comprising a filmstrip; and winding housing extending from said bracket, said filmstrip extending from said film cartridge to said winding housing.

24. A detachable cartridge in accordance with claim 23, said bracket rounded on at least one end.

25. A method for loading a detachable cartridge for a lens fitted photographic film package, the detachable cartridge including a bracket and a winding housing, the method utilizing a film cartridge having a filmstrip therein, said method comprising the steps of:

inserting the film cartridge into the bracket;

feeding the filmstrip from the cartridge into the winding housing; and winding the filmstrip within the winding housing.

26. A method in accordance with claim 25, said winding housing comprising a spool, said winding the filmstrip comprising rotating the spool.

27. A method in accordance with claim 26, said spool comprising a crank handle coupled to the spool, said rotating the spool comprising rotating the crank.

28. A method in accordance with claim 25 further comprising inserting the detachable cartridge into the lens fitted photographic film package after winding the filmstrip within the winding housing.

* * * * *